(12) United States Patent
Xu et al.

(10) Patent No.: US 12,182,503 B2
(45) Date of Patent: *Dec. 31, 2024

(54) METHOD AND APPARATUS FOR DISPLAYING ONLINE DOCUMENT, AND STORAGE MEDIUM

(71) Applicant: Beijing Bytedance Network Technology Co., Ltd., Beijing (CN)

(72) Inventors: Yu Xu, Beijing (CN); Shimin Xu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/593,836

(22) Filed: Mar. 1, 2024

(65) Prior Publication Data

US 2024/0202431 A1 Jun. 20, 2024

Related U.S. Application Data

(63) Continuation of application No. 18/319,911, filed on May 18, 2023, now Pat. No. 11,954,426, which is a
(Continued)

(30) Foreign Application Priority Data

Oct. 24, 2019 (CN) .......................... 201911019503.2

(51) Int. Cl.
*G06F 40/169* (2020.01)
*G06F 40/103* (2020.01)
(Continued)

(52) U.S. Cl.
CPC .......... *G06F 40/169* (2020.01); *G06F 40/103* (2020.01); *H04L 51/04* (2013.01); *H04L 51/046* (2013.01); *H04L 65/4015* (2013.01)

(58) Field of Classification Search
CPC ... G06F 40/169; G06F 40/103; H04L 51/046; H04L 65/4015
See application file for complete search history.

(56) References Cited

U.S. PATENT DOCUMENTS 6,708,172 B1 * 3/2004 Wong .................... G06F 16/954
345/1.3
7,747,943 B2 * 6/2010 Bargeron .............. G06F 40/169
715/201
(Continued)

FOREIGN PATENT DOCUMENTS

CA 2828011 A1 * 9/2012 ............. G06F 16/93
JP 2015207088 A * 11/2015 ....... G06F 17/30867
(Continued)

*Primary Examiner* — Shahid K Khan
(74) *Attorney, Agent, or Firm* — Astute IP Law Group

(57) ABSTRACT

Provided are a method and apparatus for displaying an online document, and a storage medium. The method for displaying an online document includes, in response to receiving an interactive instruction for a first user through the online document, generating an online document notification message on an instant messaging client of the first user, where the interactive instruction includes that a second user mentions the first user or that the second user mentions the content published by the first user in the online document; in response to receiving an instruction triggering the online document notification message, displaying the online document through the document container in the instant messaging window, where the document container is integrated into an instant messaging framework; wherein the online document is not opened through jumping to a browser but is opened in the instant messaging window.

18 Claims, 6 Drawing Sheets

Related U.S. Application Data continuation of application No. 17/726,320, filed on Apr. 21, 2022, now Pat. No. 11,699,028, which is a continuation of application No. PCT/CN2020/110415, filed on Aug. 21, 2020.

(51) Int. Cl.
*H04L 51/04* (2022.01)
*H04L 51/046* (2022.01)
*H04L 65/401* (2022.01)

(56) References Cited

U.S. PATENT DOCUMENTS

| | | | | |
|---|---|---|---|---|
| 8,239,754 | B1* | 8/2012 | Orthlieb | G06F 40/169 715/232 |
| 8,938,669 | B1* | 1/2015 | Cohen | G06Q 10/101 709/204 |
| 10,848,445 | B1* | 11/2020 | Willmann | H04L 51/046 |
| 2006/0036692 | A1* | 2/2006 | Morinigo | H04L 51/04 709/206 |
| 2009/0030872 | A1* | 1/2009 | Brezina | H04L 51/56 |
| 2009/0144371 | A1* | 6/2009 | Hind | H04L 51/046 709/227 |
| 2011/0252339 | A1* | 10/2011 | Lemonik | G06F 40/197 715/753 |
| 2012/0192047 | A1* | 7/2012 | Slatter | G06F 40/186 715/202 |
| 2012/0192055 | A1* | 7/2012 | Antebi | G06F 40/169 715/229 |
| 2012/0284197 | A1* | 11/2012 | Sitrick | G06Q 10/0631 705/301 |
| 2014/0149883 | A1* | 5/2014 | Anand | G06F 3/04842 715/751 |
| 2015/0189032 | A1* | 7/2015 | Duquene | H04L 51/046 709/204 |
| 2016/0134568 | A1* | 5/2016 | Woo | G06F 3/0484 709/206 |
| 2016/0344663 | A1* | 11/2016 | Hwang | H04L 51/10 |
| 2017/0230320 | A1* | 8/2017 | Knight | H04L 65/75 |
| 2018/0121394 | A1* | 5/2018 | Denoue | G06F 40/106 |
| 2018/0367483 | A1* | 12/2018 | Rodriguez | H04L 51/046 |
| 2018/0367484 | A1* | 12/2018 | Rodriguez | H04L 67/75 |
| 2019/0034395 | A1* | 1/2019 | Curry | G06F 40/166 |
| 2019/0036853 | A1* | 1/2019 | Denoue | G06Q 10/101 |
| 2019/0173811 | A1* | 6/2019 | Estrada | H04W 4/12 |
| 2019/0212829 | A1* | 7/2019 | Yang | H04L 51/04 |
| 2019/0222544 | A1* | 7/2019 | Ferrick | H04L 12/1813 |
| 2020/0259826 | A1* | 8/2020 | Marrone | H04L 63/0861 |
| 2021/0006515 | A1* | 1/2021 | Downs | H04L 51/02 |
| 2021/0409416 | A1* | 12/2021 | Reyna Fernandez | H04L 51/18 |
| 2022/0006846 | A1* | 1/2022 | Kumbi | G06F 3/048 |

FOREIGN PATENT DOCUMENTS

| | | | |
|---|---|---|---|
| KR | 20120039514 A | * | 4/2012 |
| KR | 20140144104 A | * | 12/2014 |
| KR | 20180004093 A | * | 1/2018 |
| WO | WO-2015153244 A1 | * | 10/2015 ........... G06F 3/0482 |

* cited by examiner

METHOD AND APPARATUS FOR DISPLAYING ONLINE DOCUMENT, AND STORAGE MEDIUM

CROSS-REFERENCE TO RELATED APPLICATIONS

This is a Continuation application of U.S. patent application Ser. No. 18/319,911 which is a U.S Continuation application of U.S. patent application Ser. No. 17/726,320 which is a U.S National Stage Application of International Patent Application No. PCT/CN2020/110415, filed on Aug. 21, 2020, which claims priority to Chinese patent application No. 201911019503.2 filed with the China National Intellectual Property Administration (CNIPA) on Oct. 24, 2019, disclosures of which are incorporated herein by reference in their entireties.

TECHNICAL FIELD

The present disclosure relates to the field of computer technology, for example, a method and apparatus for displaying an online document, and a storage medium.

BACKGROUND

Online documents are generally web page products. That is, an online document is displayed in the form of a web page in a browser; moreover, the document is edited online based on the display of the document.

A common method for combining the online document and instant messaging (IM) is to set a comment or chat module on a web page to facilitate communication between users. However, this method has the following problems: When a user intends to view or edit the online document, a browser needs to be jumped to, causing an excessively long waiting time for the user; moreover, when viewing or editing the online document, the user cannot learn other latest notification messages in IM, resulting in poor user experience.

SUMMARY

The present disclosure provides a method and apparatus for displaying an online document, an electronic device, and a storage medium to achieve an object of displaying the online document in an instant messaging window.

The present disclosure provides a method for displaying an online document. The method is applied to an instant messaging client and includes the steps below.

In response to receiving an interactive instruction for a first user through the online document, an online document notification message is generated in the instant messaging session list of the first user. The interactive instruction includes that a second user mentions the first user or that the second user mentions the content published by the first user in the online document.

In response to receiving an instruction triggering the online document notification message, a target link address is acquired.

The target link address is jumped to in an instant messaging window through a document container and the online document is displayed in the instant messaging window. The document container is integrated into an instant messaging framework.

The present disclosure further provides an apparatus for displaying an online document. The apparatus includes a generation module, an acquisition module, and a display module.

The generation module is configured to, in response to receiving an interactive instruction for a first user through the online document, generate an online document notification message in the instant messaging session list of the first user. The interactive instruction includes that a second user mentions the first user or that the second user mentions the content published by the first user in the online document.

The acquisition module is configured to, in response to receiving an instruction triggering the online document notification message, acquire a target link address.

The display module is configured to jump to the target link address in an instant messaging window through a document container and display the online document in the instant messaging window. The document container is integrated into an instant messaging framework.

The present disclosure further provides an electronic device. The electronic device includes one or more processors and a storage apparatus configured to store one or more programs.

The one or more programs, when executed by the one or more processors, cause the one or more processors to perform any method for displaying an online document according to embodiments of the present disclosure.

The present disclosure further provides a storage medium including computer-executable instructions which, when executed by a computer processor, are configured to cause the computer processor to perform any method for displaying an online document according to embodiments of the present disclosure.

DETAILED DESCRIPTION

Embodiments of the present disclosure are described in more detail hereinafter with reference to the drawings.

Steps recited in the method embodiments of the present disclosure may be performed in a different order and/or in parallel. Additionally, the method embodiments may include an additional step and/or omit performing an illustrated step.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; the term "some embodiments" means "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions performed by the apparatus, module, or unit.

References to modifications of "one" or "a plurality" mentioned in the present disclosure are intended to be illustrative and not limiting; those skilled in the art should understand that "one" or "a plurality" should be understood as "one or more" unless clearly expressed in the context.

Embodiment One

Figures 1, 2:
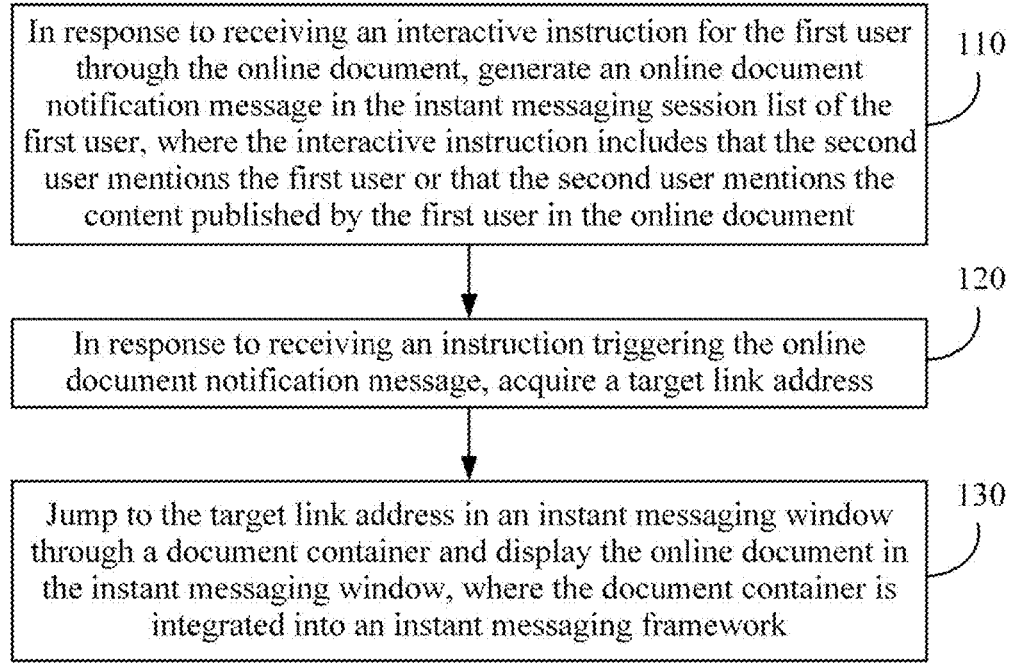
FIG. 1 is a flowchart of a method for displaying an online document according to embodiment one of the present disclosure.
FIG. 2 is a view of an interface where a second user mentions a first user in the online document according to embodiment one of the present disclosure.

FIG. 1 is a flowchart of a method for displaying an online document according to embodiment one of the present disclosure. The method for displaying an online document is applied to an instant messaging (IM) client and is suitable for a scenario where the online document is displayed in an instant messaging window. Specifically, in addition to retaining the inherent functions of the online document, a personalized function adapted to instant messaging is added to the online document. For example, a second user may mention a first user in the online document; alternatively, the second user performs an operation including commenting, annotation, or modification on the information published by the first user in the online document. Correspondingly, a notification message of the related online document is displayed in the instant messaging session list of the first user to notify the first user that the first user was mentioned by the second user or that the second user commented on, annotated, or modified the information published by the first user. Accordingly, the instant messaging users are enabled to have in-depth communication on a certain topic, especially a text-related topic, in the online document, making the communication and interaction in the document more convenient. The method may be performed by an apparatus for displaying an online document. The apparatus may be implemented in the form of at least one of software or hardware.

As shown in FIG. 1, the method for displaying an online document provided in this embodiment includes the steps below.

In step 110, in response to receiving an interactive instruction for the first user through the online document, an online document notification message is generated in the instant messaging session list of the first user. The interactive instruction includes that the second user mentions the first user or that the second user mentions the content published by the first user in the online document.

As for the second user mentioning the first user, it may be that the second user mentions the first user in the online document through the manner of "@". Of course, the second user may mention the first user through another symbol. The specific symbol used for mentioning the user depends on the specific design carried out when the online document is developed. Exemplarily, referring to FIG. 2, FIG. 2 is a view of an interface where the second user mentions the first user in the online document. Here the first user is "Yu Xu". The second user mentions the first user "Yu Xu" through the manner of entering "@Yu Xu" in the online document.

That the second user mentions the content published by the first user in the online document includes that the second user comments on, annotates, or modifies the content published by the first user in the online document.

Figure 3:
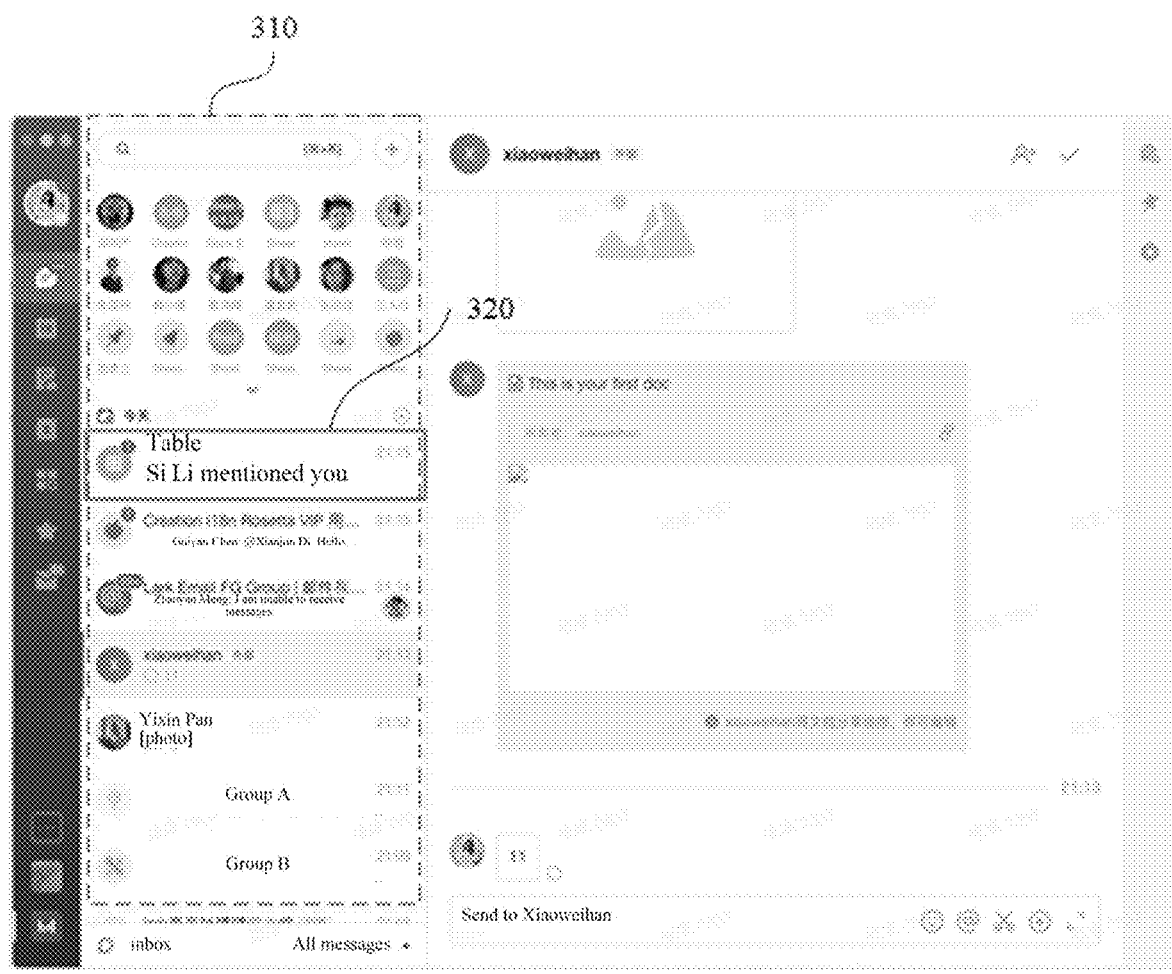
FIG. 3 is a view of an interface where an online document notification message is generated in an instant messaging session list according to embodiment one of the present disclosure.

That the online document notification message is used for notifying the first user includes that the first user was mentioned by others or that the content published by the first user in the online document was mentioned by others. Exemplarily, referring to FIG. 3, FIG. 3 is a view of an interface where the online document notification message is generated in the instant messaging session list. A region 310 in FIG. 3 represents the instant messaging session list. A block 320 represents the online document notification message. It can be seen from FIG. 3 that the online document notification message includes an icon of the online document and the specific content of the notification message, for example, the specific content of the notification message is that "San Zhang mentioned you" or a message that "San Zhang commented on the content published by you".

The online document includes Word text, txt text, or an Excel table. The technical solutions in this embodiment are described with an example in which the online document is an Excel table.

In step 120, in response to receiving an instruction triggering the online document notification message, a target link address is acquired.

In step 130, the target link address is jumped to in an instant messaging window through a document container and the online document is displayed in the instant messaging window. The document container is integrated into an instant messaging framework.

When the first user triggers the instruction of the online document notification message, the first user is able to see the specific content of the online document in the instant messaging window of the first user. The specific content of the online document is, for example, the comment, annotation or modification made by the second user on the content published by the first user in the online document.

The target link address is an address for storing the product code of the online document. That is, the icon of the online document displayed in the instant messaging client corresponds to a sole target link address. The target link address is usually stored in a server providing services for the instant messaging client so that all users of the instant messaging client can share the online document. When receiving the instruction triggering the online document notification message, the instant messaging client acquires the target link address from the server.

The document container is integrated into the instant messaging framework. The document container is equivalent to a service. The loading, rendering and display of the document can be implemented by calling the document container. The target link address stores the product code of the online document which may be understood as the content to be loaded and displayed. The loading, rendering and display of the product code of the online document can be implemented via the document container so that an object of displaying the online document is achieved finally. Since the document container is integrated into the instant messaging framework, an object of jumping to the target link address in the instant messaging window through the document container and displaying the document in the instant messaging window is achieved. When the current user intends to open an online document in the instant messaging window, the document does not need to be opened through jumping to a browser but can be opened in the instant messaging window. At this point, when the instant messaging client receives a chat message sent by another user, the current user may learn the chat message timely. The display of the online document does not affect the current user's timely learning of other notification messages of the instant messaging client. The user can conveniently switch from the window displaying the online document to the chat window with a friend.

Exemplarily, the step in which the target link address is jumped to in the instant messaging window through the document container and the online document is displayed in the instant messaging window includes the step below.

In the online document displayed in the instant messaging window, the information corresponding to the interactive instruction for the first user is positioned and displayed.

In response to the interactive instruction for the first user being that the second user mentions the first user, the step in which in the online document displayed in the instant messaging window, the information corresponding to the interactive instruction for the first user is positioned and displayed includes the steps below.

A place where the second user mentions the first user in the online document is positioned.

The place is displayed in the online document displayed in the instant messaging window and an area where a mentioned identifier of the first user is located is highlighted.

The step in which the target link address is jumped to in the instant messaging window through the document container and the online document is displayed in the instant messaging window further includes the step below.

In a first display area of the instant messaging window, the information corresponding to the interactive instruction for the first user is positioned and displayed; moreover, in a second display area of the instant messaging window, a notification message corresponding to the information is displayed.

The first user is allowed to reply to the notification message in the second display area.

Figure 4:
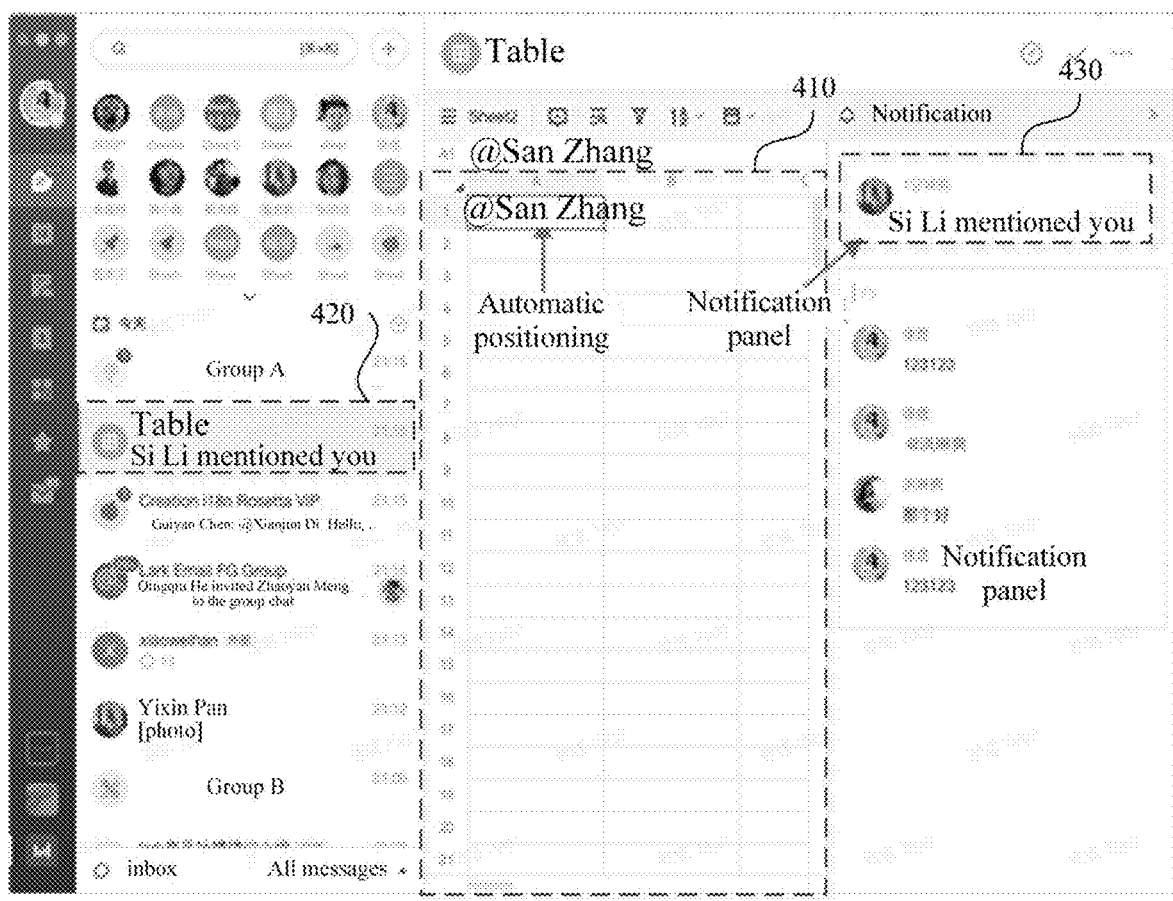
FIG. 4 is a view of an interface where the online document is displayed in an instant messaging window according to embodiment one of the present disclosure.

Exemplarily, referring to FIG. 4, FIG. 4 is a view of an interface where the online document is displayed in the instant messaging window. The interface in FIG. 4 is the display interface of the instant messaging client of the first user "San Zhang". A window 410 represents the first display area of the instant messaging window. The first display area displays the page of the opened online document. It can be seen that the second user "Si Li" mentioned the first user "San Zhang" in the online document. The first user "San Zhang" opens and displays the online document by triggering the document notification message 420 displayed in the session list; that is, the first user "San Zhang" acquires the display page of the window 410. Moreover, it can also be seen from FIG. 4 that when the online document is displayed, the information (@ San Zhang) that is generated most recently in the online document and unread by the first user "San Zhang" is positioned and displayed in the online document. That is, the place where the second user mentions the first user in the online document is positioned. Moreover, the notification message corresponding to the unread information is also displayed in the second display area 430 of the instant messaging window. The notification message shown in FIG. 4 is specifically that "Si Li mentioned you". The first user "San Zhang" may reply to the notification message that "Si Li mentioned you" in the second display area 430. For example, if the first user "San Zhang" replies a message "received", then the corresponding online document notification message may be generated in the instant messaging session list of the second user "Si Li" at this point.

Exemplarily, the step in which the target link address is jumped to in the instant messaging window through the document container and the online document is displayed in the instant messaging window includes the step below.

In the online document displayed in the instant messaging window, the information corresponding to the interactive instruction for the first user is positioned and displayed.

In response to the interactive instruction for the first user being that the second user edits the content published by the first user in the online document, the step in which in the online document displayed in the instant messaging window, the information corresponding to the interactive instruction for the first user is positioned and displayed includes the steps below.

A content area targeted when the second user edits the content is positioned.

The content area is highlighted in the online document displayed in the instant messaging window.

When the first user published the content in the online document, the second user may see the content and edits the content, and the area in which the second user edits the content published by the first user is positioned and is highlighted in the online document.

In response to the interactive instruction for the first user being that the second user comments on the content published by the first user in the online document, the step in which in the online document displayed in the instant messaging window, the information corresponding to the interactive instruction for the first user is positioned and displayed includes the steps below.

A content area targeted when the second user comments and a comment area generated when the second user comments are positioned.

The content area and the comment area are highlighted in the online document displayed in the instant messaging window.

When the first user published the content in the online document, the second user may see the content and comments on the content, and the content area in which the second user comments the content published by the first user is positioned and the comment area in which the second user publishes the comment are both positioned.

In the technical solutions of this embodiment, the technical means include, in response to receiving an interactive instruction for a first user through the online document, generating an online document notification message in the instant messaging session list of the first user, where the interactive instruction includes that a second user mentions the first user or that the second user mentions the content published by the first user in the online document; in response to receiving an instruction triggering the online document notification message, acquiring a target link address; and jumping to the target link address in an instant messaging window through a document container and displaying the online document in the instant messaging window, where the document container is integrated into an instant messaging framework. Accordingly, an object of displaying the online document in the instant messaging window is achieved without the need for jumping to a browser for display.

Embodiment Two

Figure 5:
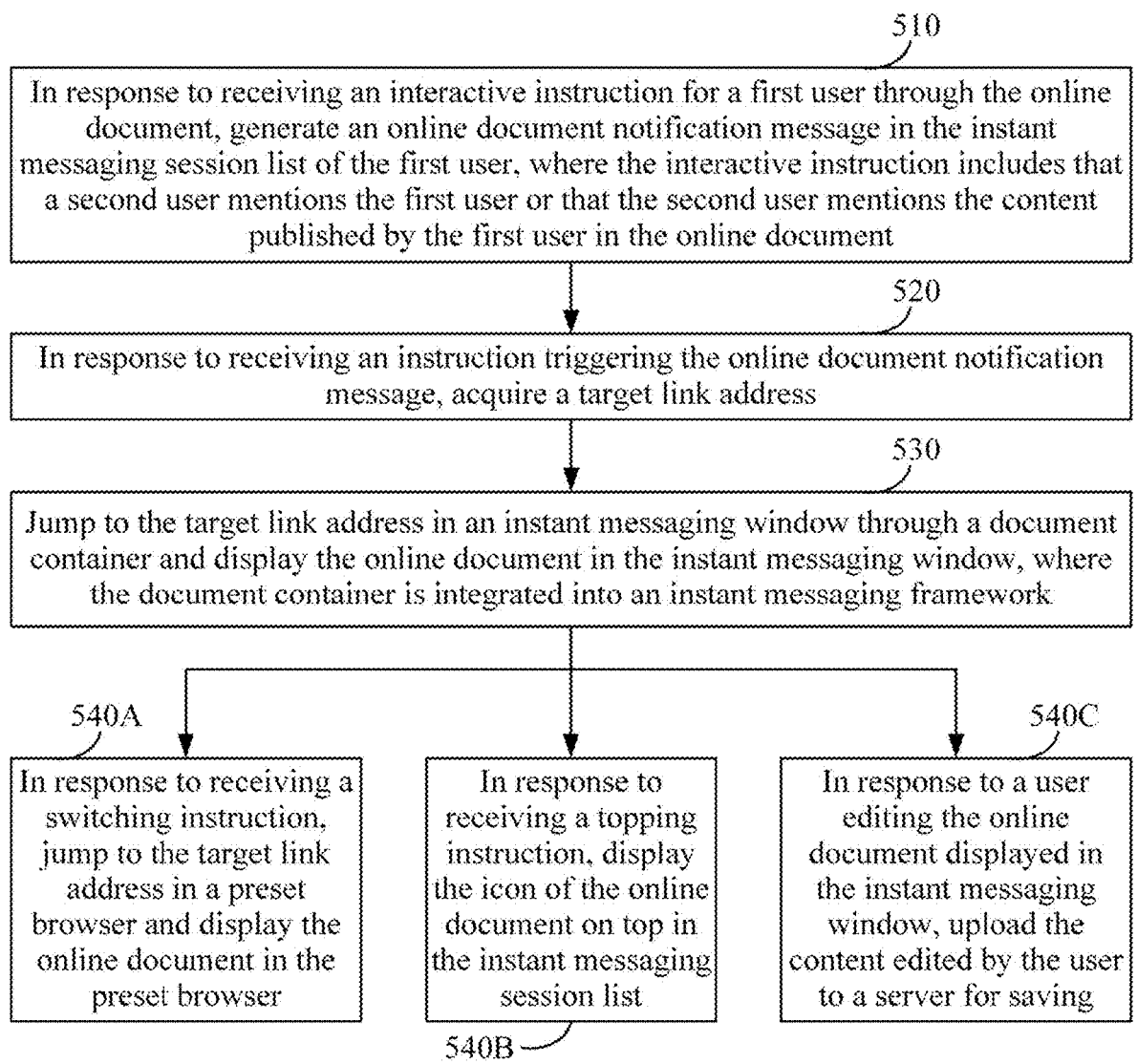
FIG. 5 is a flowchart of a method for displaying an online document according to embodiment two of the present disclosure.

FIG. 5 is a flowchart of a method for displaying an online document according to embodiment two of the present disclosure. On the basis of the preceding embodiment, this embodiment further optimizes the solutions.

As shown in FIG. 5, the method includes the steps below.

In step 510, in response to receiving an interactive instruction for a first user through the online document, an online document notification message is generated in the instant messaging session list of the first user. The interactive instruction includes that a second user mentions the first user or that the second user mentions the content published by the first user in the online document.

In step 520, in response to receiving an instruction triggering the online document notification message, a target link address is acquired.

In step 530, the target link address is jumped to in an instant messaging window through a document container and the online document is displayed in the instant messaging window. The document container is integrated into an instant messaging framework.

In step 540A, in response to receiving a switching instruction, the target link address is jumped to in a preset browser and the online document is displayed in the preset browser.

The number of editing functions for the online document displayed in the preset browser is greater than the number of editing functions for the online document displayed in the instant messaging window.

In step 540B, in response to receiving a topping instruction, the icon of the online document is displayed on top in the instant messaging session list.

An opening instruction of the online document is able to be triggered through the icon of the online document.

In step 540C, in response to a user editing the online document displayed in the instant messaging window, the content edited by the user is uploaded to a server for saving.

It needs to be mentioned that the inherent functions of the online document displayed in the instant messaging window are retained. For example, for a Word document, the online document has inherent functions for editing text, for example, setting the font, font size and color of the text. For an Excel document, the online document has inherent functions such as sorting and summation.

In the case where the online document is an Excel table, the method further includes the step below.

In response to receiving an instruction of creating a worksheet triggered by the user based on a table displayed in the instant messaging window, the created worksheet is uploaded to the server for saving.

Figure 6:
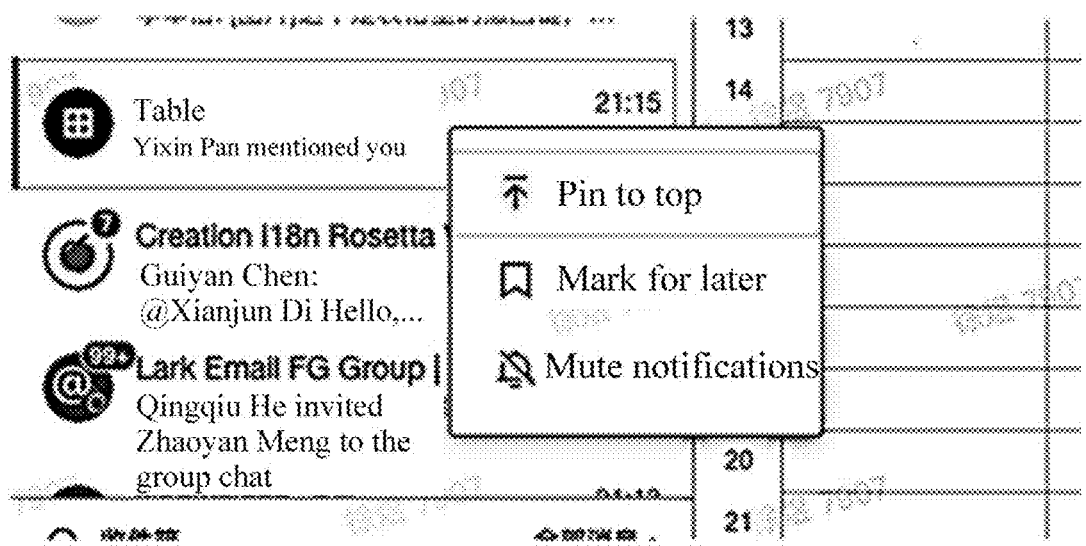
FIG. 6 is a view of an operation method for pinning the icon of the online document to the top according to embodiment two of the present disclosure.

If the online document is relatively important or the user does not finish editing the online document, the icon of the online document can be pinned to the top via the topping function of instant messaging. That is, the icon of the online document is displayed in the first line of the session list so as to help the user find and open the online document to continue viewing or editing the document. Exemplarily, referring to FIG. 6, FIG. 6 is a view of an operation method for pinning the icon of the online document to the top.

Due to the limited size of the instant messaging window, not all the editing tools of the online document can be displayed, and the editing tools may be hidden, folded, or deleted. In this regard, if the user needs a more complete toolbar or a stronger editing window, the method for displaying an online document provided in this embodiment supports opening the online document in the browser.

An instant messaging client is configured to be installed in a terminal. The call interface of the browser installed on the terminal by default is written into the implementation program of the instant messaging client. When the switching instruction is received, the browser is called so that the target link address is opened and the document is displayed in the preset browser. The browser installed on the terminal by default refers to the browser provided by the system of the terminal, that is, the browser installed directly on the terminal without user selection.

In the technical solutions of this embodiment, the arrangement in which an online document is provided with the topping function helps achieve an object of enabling a user to find the icon of the online document quickly and thus achieve an object of enabling the user to find and use the online document quickly, thereby improving user experience.

Embodiment Three

Figure 7:
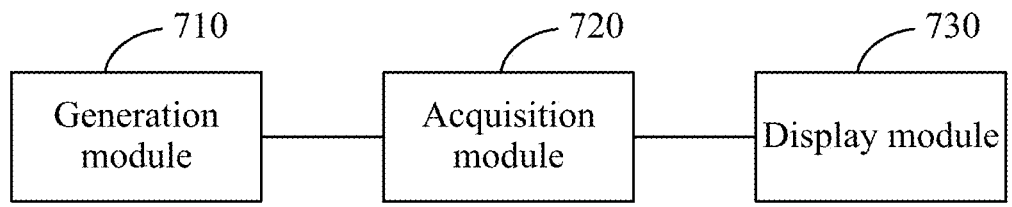
FIG. 7 is a diagram illustrating the structure of an apparatus for displaying an online document according to embodiment three of the present disclosure.

FIG. 7 shows an apparatus for displaying an online document according to embodiment three. The apparatus includes a generation module 710, an acquisition module 720, and a display module 730.

The generation module 710 is configured to, in response to receiving an interactive instruction for a first user through the online document, generate an online document notification message in the instant messaging session list of the first user. The interactive instruction includes that a second user mentions the first user or that the second user mentions the content published by the first user in the online document. The acquisition module 720 is configured to, in response to receiving an instruction triggering the online document notification message, acquire a target link address. The display module 730 is configured to jump to the target link address in an instant messaging window through a document container and display the online document in the instant messaging window. The document container is integrated into an instant messaging framework.

On the basis of the preceding technical solutions, the display module 730 is configured to, in the online document displayed in the instant messaging window, position and display the information corresponding to the interactive instruction for the first user.

On the basis of the preceding technical solutions, the display module 730 includes a positioning unit and a display unit.

The positioning unit is configured to, in response to the interactive instruction for the first user being that the second user mentions the first user, position a place where the second user mentions the first user in the online document; or in response to the interactive instruction for the first user being that the second user edits the content published by the first user in the online document, position a content area targeted when the second user edits the content; or in response to the interactive instruction for the first user being that the second user comments on the content published by the first user in the online document, position a content area targeted when the second user comments and a comment area generated when the second user comments.

The display unit is configured to display the place in the online document displayed in the instant messaging window and highlight an area where a mentioned identifier of the first user is located, or highlight the content area in the online document displayed in the instant messaging window, or highlight the content area and the comment area in the online document displayed in the instant messaging window.

On the basis of the preceding technical solutions, the display module 730 may further be configured to, in a first display area of the instant messaging window, position and display the information corresponding to the interactive instruction for the first user and, in a second display area of the instant messaging window, display a notification message corresponding to the information.

The first user is allowed to reply to the notification message in the second display area.

On the basis of the preceding technical solutions, the apparatus further includes a switching module.

The switching module is configured to, in response to receiving a switching instruction, jump to the target link address in a preset browser and display the online document in the preset browser.

The number of editing functions for the online document displayed in the preset browser is greater than the number of editing functions for the online document displayed in the instant messaging window.

On the basis of the preceding technical solutions, the apparatus further includes a topping module.

The topping module is configured to, in response to receiving a topping instruction, display the icon of the online document on top in the instant messaging session list.

An opening instruction of the online document is able to be triggered through the icon of the online document.

On the basis of the preceding technical solutions, the document includes an Excel table, Word text, or txt text.

On the basis of the preceding technical solutions, the apparatus further includes an upload module.

The upload module is configured to, in response to a user editing the online document displayed in the instant messaging window, upload the content edited by the user to a server for saving. Alternatively, in the case where the online document is an Excel table, the upload module is configured to, in response to receiving an instruction of creating a worksheet triggered by the user based on a table displayed in the instant messaging window, upload the created worksheet to the server for saving.

In the technical solutions of this embodiment, the technical means include, in response to receiving an interactive instruction for a first user through the online document, generating an online document notification message in the instant messaging session list of the first user, where the interactive instruction includes that a second user mentions the first user or that the second user mentions the content published by the first user in the online document; in response to receiving an instruction triggering the online document notification message, acquiring a target link address; and jumping to the target link address in an instant messaging window through a document container and displaying the online document in the instant messaging window, where the document container is integrated into an instant messaging framework. Accordingly, an object of displaying the online document in the instant messaging window is achieved without the need for jumping to a browser for display.

The apparatus for displaying an online document provided in this embodiment can perform the method for displaying an online document provided in any embodiment of the present disclosure and has functional modules and effects corresponding to the method performed.

It is to be noted that units and modules included in the preceding apparatus are just divided according to functional logic, and the division is not limited to this, as long as the corresponding functions can be implemented. Additionally, the specific names of the units and modules are just intended for distinguishing, and are not to limit the protection scope of embodiments of the present disclosure.

Embodiment Four

Figure 8:
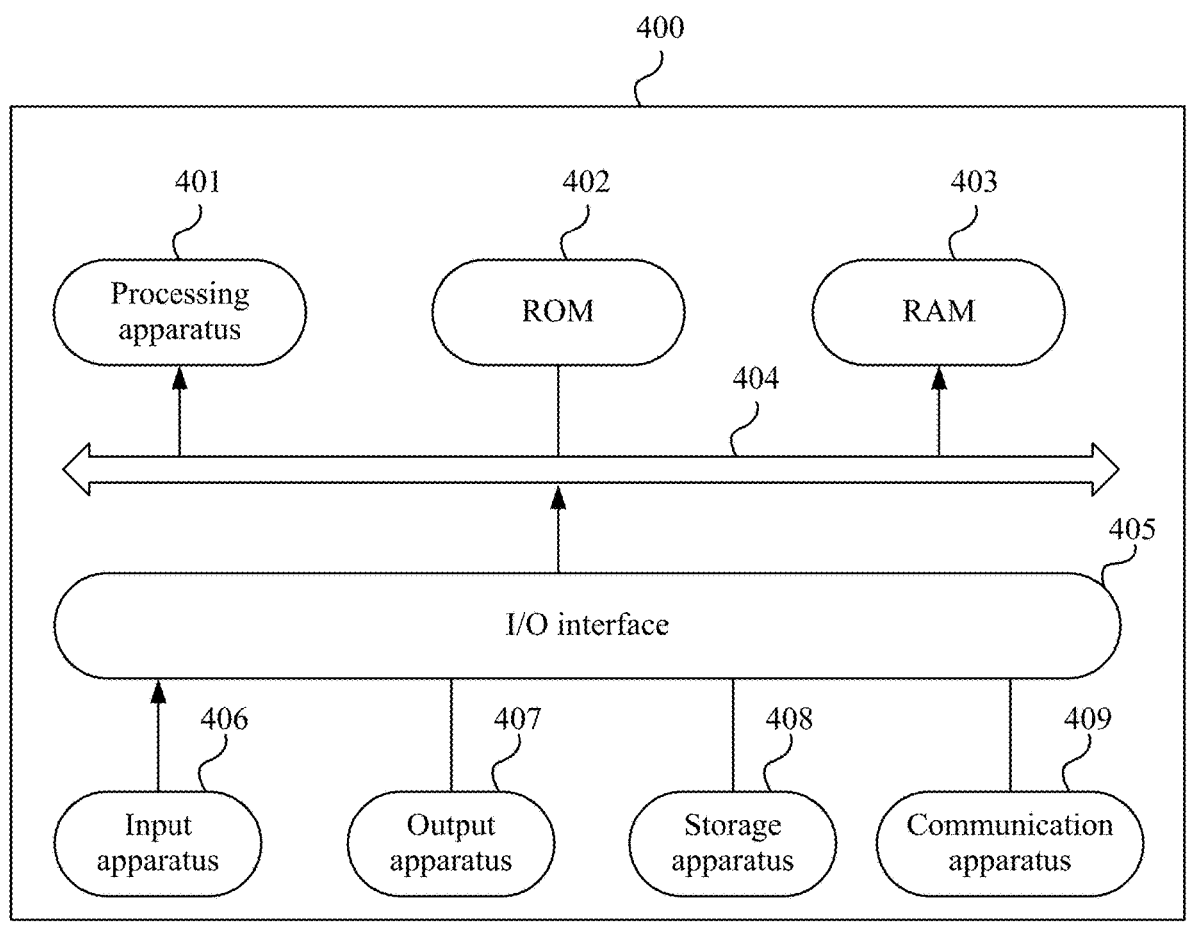
FIG. 8 is a diagram illustrating the structure of an electronic device according to embodiment four of the present disclosure.

Referring to FIG. 8, FIG. 8 shows a diagram illustrating the structure of an electronic device 400 for implementing a method for displaying an online document according to embodiments of the present disclosure. The electronic device 400 may be, for example, a terminal device or a server shown in FIG. 8. The terminal device in this embodiment may include, but is not limited to, mobile terminals such as a mobile phone, a laptop, a digital broadcast receiver, a personal digital assistant (PDA), a portable Android device (PAD), a portable media player (PMP), and an in-vehicle terminal (for example, an in-vehicle navigation terminal); and stationary terminals such as a digital television (TV) and a desktop computer. The electronic device shown in FIG. 8 is merely an example and is not intended to limit the function and usage scope of embodiments of the present disclosure.

As shown in FIG. 8, the electronic device 400 may include a processing apparatus 401, for example, a central processing unit or a graphics processing unit. The processing apparatus 401 may execute, according to a program stored in a read-only memory (ROM) 402 or a program loaded into a random access memory (RAM) 403 from a storage apparatus 408, various appropriate actions and processing. Various programs and data required for the operation of the electronic device 400 are also stored in the RAM 403. The processing apparatus 401, the ROM 402, and the RAM 403 are connected to each other through a bus 404. An input/output (I/O) interface 405 is also connected to the bus 404.

Generally, the following apparatuses may be connected to an I/O interface 405: an input apparatus 406 such as a touch screen, a touch pad, a keyboard, a mouse, a camera, a microphone, an accelerometer, and a gyroscope; an output apparatus 407 such as a liquid crystal display (LCD), a speaker, and a vibrator; the storage apparatus 408 such as a magnetic tape and a hard disk; and a communication apparatus 409. The communication apparatus 409 may allow the electronic device 400 to perform wireless or wired communication with other devices to exchange data. Although FIG. 8 shows the electronic device 400 having various apparatuses, it is to be understood that not all the apparatuses shown herein need to be implemented or present. Alternatively, more or fewer apparatuses may be implemented or present.

According to this embodiment, the process described above with reference to the flowchart may be implemented through a computer software program. For example, this embodiment includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 409, or may be installed from the storage apparatus 408, or may be installed from the ROM 402. When the computer program is executed by the processing apparatus 401, the preceding functions defined in the method of this embodiment are executed.

For the content not described in detail in this embodiment, refer to the preceding embodiments. This embodiment has the same effect as the preceding embodiments.

Embodiment Five

This embodiment provides a computer storage medium for storing a computer program which, when executed by a processor, causes the processor to perform the method for displaying an online document provided in the preceding embodiments.

The preceding computer storage medium of the present disclosure may be a computer-readable storage medium. The computer-readable storage media may include, but is not limited to, an electrical, magnetic, optical, electromagnetic, infrared or semiconductor system, apparatus or device, or any combination thereof. A more specific example of the computer-readable storage medium may include, but is not limited to, an electrical connection having one or more wires, a portable computer magnetic disk, a hard disk, a RAM, a ROM, an erasable programmable read-only memory (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. The computer-readable storage medium belongs to a computer-readable medium. The computer-readable medium may also include a computer-readable signal medium. The computer-readable signal medium may include a data signal propagated on a baseband or as part of a carrier. Computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area network (WAN), an internet (for example, the Internet), a peer-to-peer network (for example, an Ad-Hoc network), and any network currently known or to be developed in the future.

The computer-readable medium may be included in the electronic device or may exist alone without being assembled into the electronic device.

The computer-readable medium carries one or more programs. When the one or more programs are executed by the electronic device, the electronic device is configured to, in response to receiving an interactive instruction for a first user through an online document, generate an online document notification message in the instant messaging session list of the first user, where the interactive instruction includes that a second user mentions the first user or that the second user mentions the content published by the first user in the online document; in response to receiving an instruction triggering the online document notification message, acquire a target link address; and jump to the target link address in an instant messaging window through a document container and display the online document in the instant messaging window, where the document container is integrated into an instant messaging framework.

Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, partly on the user computer, as a stand-alone software package, partly on the user computer and partly on a remote computer, or entirely on the remote computer or a server. In the scenario involving the remote computer, the remote computer may be connected to the user computer through any type of network, including a local area network (LAN) or a wide area network (WAN), or the connection may be made to an external computer, for example, through the Internet using an Internet service provider.

The flowcharts and block diagrams in the drawings show the possible architecture, function and operation of the system, method and computer program product according to various embodiments of the present disclosure. In this regard, each block in a flowchart or block diagram may represent a module, a program segment, or part of codes that contains one or more executable instructions for implementing specified logical functions. It is also to be noted that in some alternative implementations, the functions in the blocks may occur in sequences different from those shown in the drawings. For example, two successive blocks may in fact be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in embodiments of the present disclosure may be implemented by software or hardware. The name of a unit is not intended to limit the unit in a certain circumstance. For example, an editable content display unit may also be described as an "editing unit".

The functions described above herein may be performed, at least partially, by one or more hardware logic components. For example, without limitation, exemplary types of hardware logic components that may be used include a field programmable gate array (FPGA), an application specific integrated circuit (ASIC), application specific standard product (ASSP), a System-on-a-Chip (SOC), and a complex programmable logic device (CPLD).

In the context of the present disclosure, a computer-readable medium may be a tangible medium that may include or store a program that is used by or in conjunction with a system, apparatus or device that executes instructions. According to one or more embodiments of the present disclosure, example one provides a method for displaying an online document. The method includes the steps below.

In response to receiving an interactive instruction for a first user through the online document, an online document notification message is generated in the instant messaging session list of the first user. The interactive instruction includes that a second user mentions the first user or that the second user mentions the content published by the first user in the online document.

In response to receiving an instruction triggering the online document notification message, a target link address is acquired.

The target link address is jumped to in an instant messaging window through a document container and the online document is displayed in the instant messaging window. The document container is integrated into an instant messaging framework.

According to one or more embodiments of the present disclosure, example two provides a method for displaying an online document. Optionally, the step in which the target link address is jumped to in the instant messaging window through the document container and the online document is displayed in the instant messaging window includes the step below.

In the online document displayed in the instant messaging window, the information corresponding to the interactive instruction for the first user is positioned and displayed.

According to one or more embodiments of the present disclosure, example three provides a method for displaying an online document. Optionally, in response to the interactive instruction for the first user being that the second user mentions the first user, the step in which in the online document displayed in the instant messaging window, the information corresponding to the interactive instruction for the first user is positioned and displayed includes the steps below.

A place where the second user mentions the first user in the online document is positioned.

The place is displayed in the online document displayed in the instant messaging window and an area where a mentioned identifier of the first user is located is highlighted.

In response to the interactive instruction for the first user being that the second user edits the content published by the first user in the online document, the step in which in the online document displayed in the instant messaging window, the information corresponding to the interactive instruction for the first user is positioned and displayed includes the steps below.

A content area targeted when the second user edits the content is positioned.

The content area is highlighted in the online document displayed in the instant messaging window.

In response to the interactive instruction for the first user being that the second user comments on the content published by the first user in the online document, the step in which in the online document displayed in the instant messaging window, the information corresponding to the interactive instruction for the first user is positioned and displayed includes the steps below.

A content area targeted when the second user comments and a comment area generated when the second user comments are positioned.

The content area and the comment area are highlighted in the online document displayed in the instant messaging window.

According to one or more embodiments of the present disclosure, example four provides a method for displaying an online document. Optionally, the step in which the target link address is jumped to in the instant messaging window through the document container and the online document is displayed in the instant messaging window includes the step below.

In a first display area of the instant messaging window, the information corresponding to the interactive instruction for the first user is positioned and displayed; moreover, in a second display area of the instant messaging window, a notification message corresponding to the information is displayed.

The first user is allowed to reply to the notification message in the second display area.

According to one or more embodiments of the present disclosure, example five provides a method for displaying an online document. Optionally, the method includes the step below.

In response to receiving a switching instruction, the target link address is jumped to in a preset browser and the online document is displayed in the preset browser.

The number of editing functions for the online document displayed in the preset browser is greater than the number of editing functions for the online document displayed in the instant messaging window.

According to one or more embodiments of the present disclosure, example six provides a method for displaying an online document. Optionally, the method includes the step below.

In response to receiving a topping instruction, the icon of the online document is displayed on top in the instant messaging session list.

An opening instruction of the online document is able to be triggered through the icon of the online document.

According to one or more embodiments of the present disclosure, example seven provides a method for displaying an online document. Optionally, the method includes the step below.

In response to a user editing the online document displayed in the instant messaging window, the content edited by the user is uploaded to a server for saving.

According to one or more embodiments of the present disclosure, example eight provides an apparatus for displaying an online document. The apparatus includes a generate module, an acquisition module, and a display module.

The generation module is configured to, in response to receiving an interactive instruction for a first user through the online document, generate an online document notification message in the instant messaging session list of the first user. The interactive instruction includes that a second user mentions the first user or that the second user mentions the content published by the first user in the online document.

The acquisition module is configured to, in response to receiving an instruction triggering the online document notification message, acquire a target link address.

The display module is configured to jump to the target link address in an instant messaging window through a document container and display the online document in the instant messaging window. The document container is integrated into an instant messaging framework.

According to one or more embodiment of the present disclosure, example nine provides an electronic device. The electronic device includes one or more processors and a storage apparatus configured to store one or more programs.

The one or more programs, when executed by the one or more processors, cause the one or more processors to perform the method for displaying an online document below.

In response to receiving an interactive instruction for a first user through the online document, an online document notification message is generated in the instant messaging session list of the first user. The interactive instruction includes that a second user mentions the first user or that the second user mentions the content published by the first user in the online document.

In response to receiving an instruction triggering the online document notification message, a target link address is acquired.

The target link address is jumped to in an instant messaging window through a document container and the online document is displayed in the instant messaging window. The document container is integrated into an instant messaging framework.

According to one or more embodiments of the present disclosure, example ten provides a storage medium including computer-executable instructions which, when executed by a computer processor, are configured to cause the computer processor to perform the method for displaying an online document below.

In response to receiving an interactive instruction for a first user through the online document, an online document notification message is generated in the instant messaging session list of the first user. The interactive instruction includes that a second user mentions the first user or that the second user mentions the content published by the first user in the online document.

In response to receiving an instruction triggering the online document notification message, a target link address is acquired.

The target link address is jumped to in an instant messaging window through a document container and the online document is displayed in the instant messaging window. The document container is integrated into an instant messaging framework.

Although the operations are depicted in a particular order, this should not be construed as requiring that such operations should be performed in the particular order shown or in a sequential order. In certain circumstances, multitasking and parallel processing may be advantageous. Similarly, although specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments, individually, or in any suitable sub-combination.

What is claimed is:

1. A method for displaying an online document, wherein the method is applied to an instant messaging client and comprises:
   in response to receiving an interactive instruction for a first user through the online document, generating an online document notification message on the instant messaging client of the first user, wherein the interactive instruction comprises that a second user mentions the first user in the online document or that the second user mentions content published by the first user in the online document; and
   in response to receiving an instruction triggering the online document notification message, displaying the online document through a document container in the instant messaging window of the instant messaging client, wherein the document container is integrated into a framework of the instant messaging client;
   wherein displaying the online document through the document container in the instant messaging window of the instant messaging client comprises:
   in a first display area of the instant messaging window, displaying information corresponding to the interactive instruction for the first user, wherein the first display area displays a page of the online document, and wherein the first user is allowed to reply to the information in the first display area;
   wherein the online document is not opened through jumping to a browser but is opened in the instant messaging window; and
   wherein the method further comprises: in response to receiving a switching instruction, displaying the online document in a preset browser, wherein a number of editing functions for the online document displayed in the preset browser is greater than a number of editing functions for the online document displayed in the instant messaging window.

2. The method according to claim 1, wherein displaying the online document through the document container in the instant messaging window of the instant messaging client comprises:
   in the online document displayed in the instant messaging window of the instant messaging client, positioning and displaying the information corresponding to the interactive instruction for the first user.

3. The method according to claim 2, wherein in response to the interactive instruction for the first user being that the second user mentions the first user, in the online document displayed in the instant messaging window of the instant messaging client, positioning and displaying the information corresponding to the interactive instruction for the first user comprises:
   positioning a place where the second user mentions the first user in the online document; and
   displaying the place in the online document displayed in the instant messaging window and highlighting an area where a mentioned identifier of the first user is located.

4. The method according to claim 2, wherein in response to the interactive instruction for the first user being that the second user edits the content published by the first user in the online document, in the online document displayed in the instant messaging window of the instant messaging client, positioning and displaying the information corresponding to the interactive instruction for the first user comprises:
   positioning a content area targeted when the second user edits the content; and
   highlighting the content area in the online document displayed in the instant messaging window.

5. The method according to claim 2, wherein in response to the interactive instruction for the first user being that the second user comments on the content published by the first user in the online document, in the online document displayed in the instant messaging window of the instant messaging client, positioning and displaying the information corresponding to the interactive instruction for the first user comprises:
   positioning a content area targeted when the second user comments and a comment area generated when the second user comments; and
   highlighting the content area and the comment area in the online document displayed in the instant messaging window.

6. The method according to claim 1, wherein displaying the online document through the document container in the instant messaging window of the instant messaging client further comprises:
   in a second display area of the instant messaging window, displaying a notification message corresponding to the information, wherein the first user is allowed to reply to the notification message in the second display area.

7. The method according to claim 2, wherein displaying the online document through the document container in the instant messaging window of the instant messaging client further comprises:

in a second display area of the instant messaging window, displaying a notification message corresponding to the information, wherein the first user is allowed to reply to the notification message in the second display area.

8. The method according to claim 3, wherein displaying the online document through the document container in the instant messaging window of the instant messaging client further comprises:
in a second display area of the instant messaging window, displaying a notification message corresponding to the information, wherein the first user is allowed to reply to the notification message in the second display area.

9. The method according to claim 4, wherein displaying the online document through the document container in the instant messaging window of the instant messaging client further comprises:
in a second display area of the instant messaging window, displaying a notification message corresponding to the information, wherein the first user is allowed to reply to the notification message in the second display area.

10. The method according to claim 5, wherein displaying the online document through the document container in the instant messaging window of the instant messaging client further comprises:
in a second display area of the instant messaging window, displaying a notification message corresponding to the information, wherein the first user is allowed to reply to the notification message in the second display area.

11. The method according to claim 1, wherein the online document notification message is used for notifying the first user that the first user is mentioned by the second user or that the content published by the first user in the online document is mentioned by the second user.

12. The method according to claim 1, further comprising:
in response to receiving a topping instruction, displaying an icon of the online document on top in an instant messaging session list,
wherein an opening instruction of the online document is able to be triggered through the icon of the online document.

13. The method according to claim 1, further comprising:
in response to a user editing the online document displayed in the instant messaging window, uploading content edited by the user to a server for saving.

14. An apparatus for displaying an online document, comprising a processor and a memory for storing execution instructions executed by the processor, wherein the processor is configured to:
in response to receiving an interactive instruction for a first user through the online document, generate an online document notification message on an instant messaging client of the first user, wherein the interactive instruction comprises that a second user mentions the first user in the online document or that the second user mentions content published by the first user in the online document; and
in response to receiving an instruction triggering the online document notification message, display the online document through a document container in the instant messaging window of the instant messaging client, wherein the document container is integrated into a framework of the instant messaging client;
wherein the instant messaging window comprises a first display area; and wherein the processor is configured to: in the first display area of the instant messaging window, display information corresponding to the interactive instruction for the first user, wherein the first display area displays a page of the online document, and wherein the first user is allowed to reply to the information in the first display area;
wherein the online document is not opened through jumping to a browser but is opened in the instant messaging window; and
wherein the processor is further configured to: in response to receiving a switching instruction, display the online document in a preset browser, wherein a number of editing functions for the online document displayed in the preset browser is greater than a number of editing functions for the online document displayed in the instant messaging window.

15. The apparatus according to claim 14, wherein the processor is configured to, in the online document displayed in the instant messaging window of the instant messaging client, position and display the information corresponding to the interactive instruction for the first user.

16. The apparatus according to claim 15, wherein the processor is configured to:
in response to the interactive instruction for the first user being that the second user mentions the first user in the online document, position a place where the second user mentions the first user in the online document; or in response to the interactive instruction for the first user being that the second user edits the content published by the first user in the online document, position a content area targeted when the second user edits the content; or in response to the interactive instruction for the first user being that the second user comments on the content published by the first user in the online document, position a content area targeted when the second user comments and a comment area generated when the second user comments; and
display the place in the online document displayed in the instant messaging window and highlight an area where a mentioned identifier of the first user is located, or highlight the content area in the online document displayed in the instant messaging window, or highlight the content area and the comment area in the online document displayed in the instant messaging window.

17. The apparatus according to claim 14, wherein the instant messaging window further comprises a second display area; and the processor is further configured to, in the second display area of the instant messaging window, display a notification message corresponding to the information, wherein the first user is allowed to reply to the notification message in the second display area.

18. A non-transitory computer-readable storage medium comprising computer-executable instructions which, when executed by a computer processor, are configured to cause the computer processor to perform the following steps:
in response to receiving an interactive instruction for a first user through an online document, generating an online document notification message on an instant messaging client of the first user, wherein the interactive instruction comprises that a second user mentions the first user in the online document or that the second user mentions content published by the first user in the online document; and
in response to receiving an instruction triggering the online document notification message, displaying the online document through a document container in the instant messaging window of the instant messaging client, wherein the document container is integrated into a framework of the instant messaging client;

wherein displaying the online document through the document container in the instant messaging window of the instant messaging client comprises:

in a first display area of the instant messaging window, displaying information corresponding to the interactive instruction for the first user, wherein the first display area displays a page of the online document, and wherein the first user is allowed to reply to the information in the first display area;

wherein the online document is not opened through jumping to a browser but is opened in the instant messaging window; and wherein the computer processor further performs the following step: in response to receiving a switching instruction, displaying the online document in a preset browser, wherein a number of editing functions for the online document displayed in the preset browser is greater than a number of editing functions for the online document displayed in the instant messaging window.

* * * * *